United States Patent
Kolokotronis (10) Patent No.: US 9,287,609 B2
(45) Date of Patent: Mar. 15, 2016

(54) ANTENNA SYSTEM TO CONTROL RF RADIATION EXPOSURE

(75) Inventor: Dimitris Kolokotronis, Athens (GR)

(73) Assignee: FASMETRICS S.A., Athens (GR)

( * ) Notice: Subject to any disclaimer, the term of this patent is extended or adjusted under 35 U.S.C. 154(b) by 211 days.

(21) Appl. No.: 13/993,433

(22) PCT Filed: Dec. 14, 2011

(86) PCT No.: PCT/EP2011/072831
§ 371 (c)(1),
(2), (4) Date: Jul. 12, 2013

(87) PCT Pub. No.: WO2012/080375
PCT Pub. Date: Jun. 21, 2012

(65) Prior Publication Data
US 2013/0281036 A1   Oct. 24, 2013

(30) Foreign Application Priority Data
Dec. 14, 2010   (EP) .................................... 10275128

(51) Int. Cl.
*H01Q 1/24* (2006.01)
*H04B 17/10* (2015.01)

(52) U.S. Cl.
CPC ................ *H01Q 1/24* (2013.01); *H01Q 1/246* (2013.01); *H04B 17/101* (2015.01)

(58) Field of Classification Search
CPC ......... H01Q 1/24; H01Q 1/246; H04B 17/00; H04B 17/0087; H04B 17/101; H04B 17/102
USPC .......... 455/67.11, 561, 562.1, 90.1, 90.2, 91, 455/101, 115.1, 128, 129, 193.1, 269, 455/277.1; 375/267, 347
See application file for complete search history.

(56) References Cited

U.S. PATENT DOCUMENTS

| | | | |
|---|---|---|---|
| 7,474,905 B2 * | 1/2009 | Yamaguchi et al. ........ | 455/562.1 |
| 2008/0153433 A1 * | 6/2008 | Pallonen et al. ............. | 455/90.2 |
| 2012/0157026 A1 * | 6/2012 | McKinzie et al. .......... | 455/193.1 |

FOREIGN PATENT DOCUMENTS

EP   2173010   4/2010

OTHER PUBLICATIONS

Elramly et al., "GSM base station antenna model for evaluating human exposure," *International Conference on Electrical, Electronic and Computer Engineering, ICEEC*, 596-602 (Sep. 2004).
Search Report issued in Int'l App. No. PCT/EP2011/072831 (2012).

* cited by examiner

*Primary Examiner* — Thanh Le
(74) *Attorney, Agent, or Firm* — Barnes & Thornburg LLP (57) ABSTRACT

An antenna measurement and control system for use with a transmitting antenna, the system comprising a sensor configured to determine an indication of the radiation emitted by the antenna; control circuitry connectable to the antenna and configured to selectively vary, or disengage, the power supplied to the antenna, and a processor connectable to the sensor and control circuitry, wherein the processor is configured to control the control circuitry in response to the determined indication of the emitted radiation.

17 Claims, 12 Drawing Sheets

Horizontal Patterns:

20°

30°/33°

45°

60°/65°

88°/90°

120°

Vertical Patterns:

ANTENNA SYSTEM TO CONTROL RF RADIATION EXPOSURE

This application is a U.S. nationalization under 35 U.S.C. §371 of copending International Application No. PCT/EP2011/072831, filed Dec. 14, 2011, which claims priority to European Patent Application No. 10275128.6, filed Dec. 14, 2010. The disclosures set forth in the referenced applications are incorporated herein by reference in their entireties.

FIELD OF THE INVENTION

The invention relates to installations for antenna systems, in particular those installed in urban areas. In particular the invention relates to an apparatus and method for determining a value of RF power which is indicative of the RF power emitted by the antenna and adjusting the amount of power emitted by the antenna in response to the determined value of RF power.

BACKGROUND

Monitoring of the electromagnetic (EM) field environment surrounding antennas is desirable because regulations exist which stipulate maximum radiation emissions to which humans should be exposed. Measurement devices that can monitor electromagnetic field strength are commercially available and generally known in the art. Such monitoring devices may provide accurate (on the spot) measurements of electromagnetic fields.

The installation of mobile communication antenna systems is prevalent in many urban areas due to the increase in use of mobile telephones and the like. The increased deployment of radio base stations has raised worldwide public concern regarding exposure of RF (radio frequency) electromagnetic fields to humans and, more specifically, the effects this exposure may have to human life health.

The control of the electromagnetic environment is a difficult task that depends on a number of parameters. Presently, such control is provided only on a theoretical basis. The World Health Organization (WHO) and the International Commission of Non-Ionising Radiation Protection (ICNIRP) have proposed maximum exposure limits of RF electromagnetic fields based on precautionary principles. These limits are maximum values of the electric and magnetic field strength to which humans may be exposed. Accordingly, it is desirable to measure the electromagnetic field constantly and in real-time in order to verify compliance of the regulations regarding radiation emissions from mobile communication antenna.

One problem faced by both the general public and public authorities is the difficulty of continuously measuring the RF emissions at any distance away from a given mobile communication antenna. As a result, since the electromagnetic environment cannot be continuously verified everywhere, the general public (and, in some instances) the authorities come in direct conflict with mobile network operators resulting in the delaying or even blocking of investments on such antenna systems that intend to be installed in residential and workplace areas, for example.

It is also known that the size of measurement devices placed on, or near, an antenna may adversely affect the performance of the antenna. Such a reduction in performance is undesirable.

It is an aim of the present invention to overcome, or at least mitigate at least some of the problems associated with the prior art.

SUMMARY OF THE INVENTION

According to a first aspect of the invention, there is provided an antenna measurement and control system for use with a transmitting antenna, the system comprising; a sensor configured to determine an indication of the radiation emitted by the antenna; control circuitry connectable to the antenna and configured to selectively vary, or disengage, the power supplied to the antenna, and a processor connectable to the sensor and control circuitry, wherein the processor is configured to control the control circuitry in response to the determined indication of the emitted radiation.

Preferably, wherein the system comprises the antenna. Preferably, wherein the transmitted power supplied is decreased or disengaged when the determined radiated power exceeds a predetermined limit. Preferably, wherein the transmitted power supplied is decreased until such time that the determined radiated power emitted/measured strength of RF radiation falls below the predetermined limit.

Preferably, wherein the processor varies or disengages the power supplied in response to the determined radiate power in a substantially real time manner. Preferably, wherein the sensor is a dipole probe.

Optionally wherein the predetermined limit corresponds to a maximum radiated power a set distance from the antenna.

Preferably, wherein the dipole probe length is such that presence of the probe causes the −3 dB antenna azimuth and vertical angle (beamwidth) to vary by less than 1 degree. Preferably, wherein the dipole probe length is less than 30% of the active antenna length, preferably approximately 10% of the active antenna length. Preferably, wherein the dipole probe length is such that the drop in gain is less than 0.5 dB when the probe is introduced. Preferably, wherein the dipole probe sensor is operably placed at a distance of preferably more than 30 mm away from the radiating elements of the antenna inside the main radiation beam of the antenna. Preferably where any other near-field measurement of the electric and magnetic field technique by the use of a probe can be selected. Preferably, wherein the antenna operates in the UMTS frequency band or any frequency band.

Optionally wherein the processor and control circuitry that varies or disengages the transmitted power supplied to the antenna feed is operably placed outside the main radiation beam of the antenna.

Preferably, the system comprises a radome for surrounding the antenna, the sensor bring located on or in the material of the radome. Preferably, wherein the control circuitry comprises one or more RF switches to vary, or disengage, the power supplied to the transmitter. Optionally, wherein the measured RF radiation is converted by the processor to a voltage and the RF switch compares the measured voltage to a reference voltage, and the processor is configured to control the control circuitry based on the comparison. Optionally, wherein the reference voltage is variable in response to variation in environmental factors such as temperature, neighbouring radiation emissions, etc. Preferably, wherein the power radiated by the transmitter is calculated by scaling the RF radiation measured by the sensor, by a predetermined calibration factor, representative of the total emitted radiation. Optionally, wherein the calibration factor is at least based on the sensor efficiency and the physical characteristics of the antenna.

According to a second aspect of the invention, there is provided a method of regulating the radiation emitted from an antenna; the method comprising; determining an indication of radiation emitted by the antenna; comparing the indication of radiation emitted by the antenna with a predefined value;

selectively varying, or disengaging, the power supplied to the antenna based on the comparison between the indication of radiation emitted by the antenna and the predefined value.

There may also be provided an antenna measurement and control system for use with a transmitting antenna having radiating elements and a power source; the system comprising a sensor configured to measure the strength of radiation, such as RF radiation, received at a predetermined distance from the antenna radiating elements; a processor configured to determine the radiated power emitted from the antenna based on the strength of the measured radiation from the sensor; control circuitry connectable to the transmitter and configured to selectively vary, or disengage, the power supplied to the antenna radiating elements from the power source, and therefore vary the level of radiation emitted by the radiating elements of the antenna, wherein the processor is configured to control the control circuitry to vary or disengage the power supplied to the radiating elements of the antenna in response to the determined radiated power.

The present system allows for the measurement and control of an antenna's RF/EM radiation, and consequently the exposure to humans to the radiation, in an automatic, real-time and precise manner. Furthermore, it is an object of the invention to provide apparatus that can control the amount of radiation emitted from the antenna to ensure that the antenna complies at all times with the regulatory standards regarding exposure to RF radiation. In multichannel and broadband mobile communication networks the RF radiation emitted by an antenna is not fixed. Accordingly, a given antenna may periodically emit more RF radiation. Therefore, there can be provided a real-time measurement and control system that automatically regulates the input RF power to an RF emitter, such as the antenna, to ensure that the emitted RF radiation remains within acceptable/permissible limits at all times. This is achieved by determining a value indicative of the RF power emitted by the antenna.

Thus, an antenna system can be provided which is capable of inherently monitoring and controlling its RF radiation emitted, by the use of a built-in measurement and control circuitry employing high power switching techniques for independently blocking or attenuating the RF signal feeding according to pre-defined thresholds applied to satisfy RF radiation compliance to national and international standards.

BRIEF DESCRIPTION OF THE FIGURES

Accordingly, there is described by way of example only, a smart antenna system which is able to measure and regulate the amount of RF power emitted in which.

DETAILED DESCRIPTION OF AN EMBODIMENT OF THE INVENTION

It is well known that in free space, all electromagnetic waves (radio, light, X-rays, etc.) obey the inverse-square law which states that the power density of an electromagnetic wave is proportional to the inverse of the square of the distance from the source.

Doubling the distance from a transmitter means that the power density of the radiated wave at that new location is reduced to one-quarter of its previous value. The power density per surface unit is proportional to the product of the electric and magnetic field strengths. Thus, doubling the propagation path distance from the transmitter reduces each of their received field strengths over a free-space path by one-half. As a result, measuring the electromagnetic wave directly at the source provides valuable information relevant to the calculation of the strength of radiation at any distance away from the source. For known propagation environments, the power density of the electromagnetic wave can be known.

The antenna system of the present invention ensures that the RF radiation emitted does not exceed a predetermined level and thus also ensures that the safety distance (i.e. the distance beyond which the strength of the radiation is less than or equal to the maximum value) from the source of radiation remains constant. Advantageously, this can be performed without the need to have specialized knowledge of the radio system installed (i.e. RF transmission power, effective isotropic radiated power, antenna gain & pattern, frequency of operation, number of carriers deployed, etc) which often cannot be easily derived from the network operators) and radio engineering principles. The present invention allows this fixed distance to be ensured independently of the RF transmission power variations or the number of carriers deployed at any time due to the control mechanism installed at the antenna.

Figure 1:
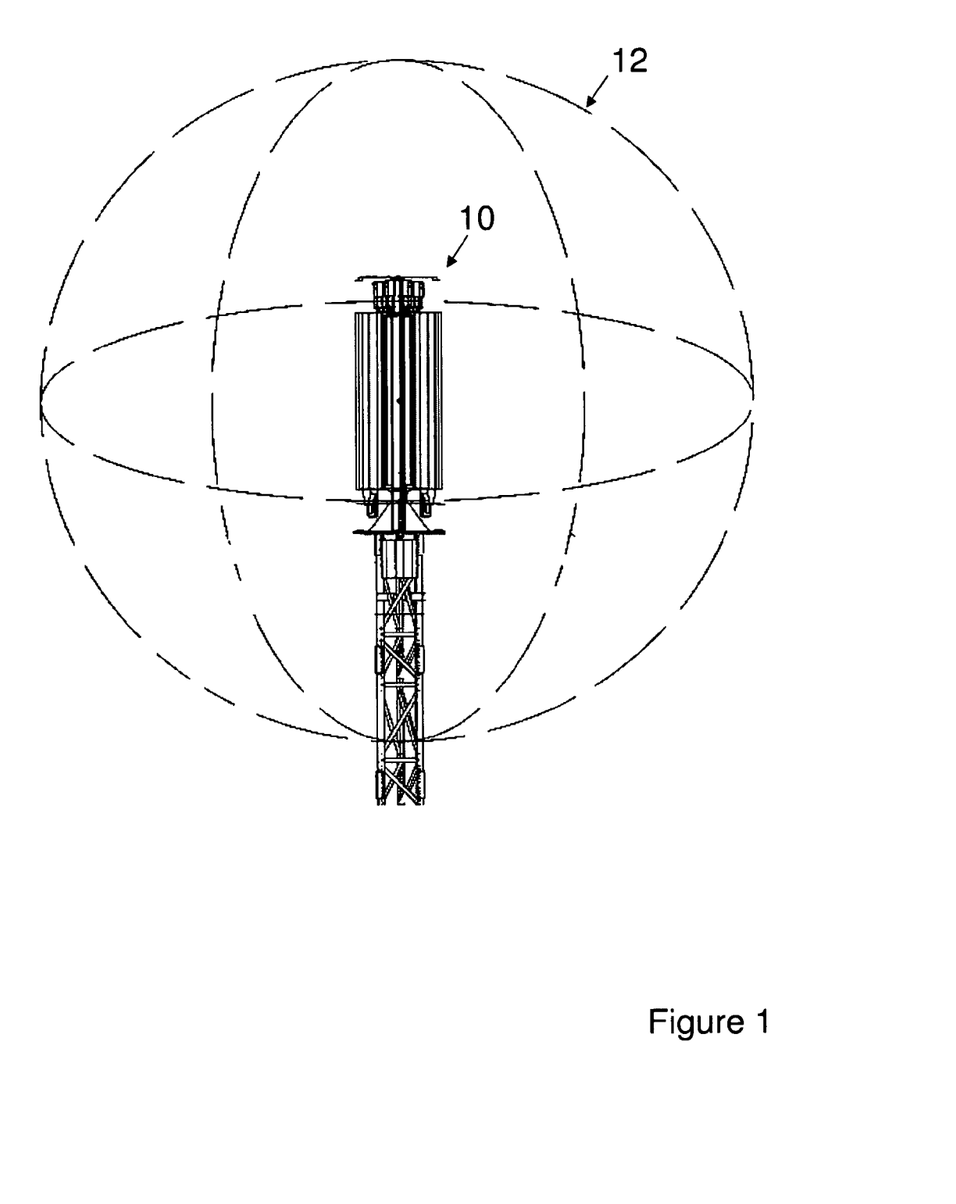
FIG. 1 is an exemplary diagram of a smart antenna system and its safety sphere.

FIG. 1 shows an embodiment of the smart antenna system 10 and its safety sphere 12. The radius of sphere 12 determines the safety distance, such that outside the sphere, the predetermined exposure limits of RF/EM radiation, based on the radiation control mechanism described in this invention as applied to the antenna, are satisfied. The antenna system 10 shown uses a 2×16 dipole UMTS antenna of active length of 1000 mm.

Figure 2:
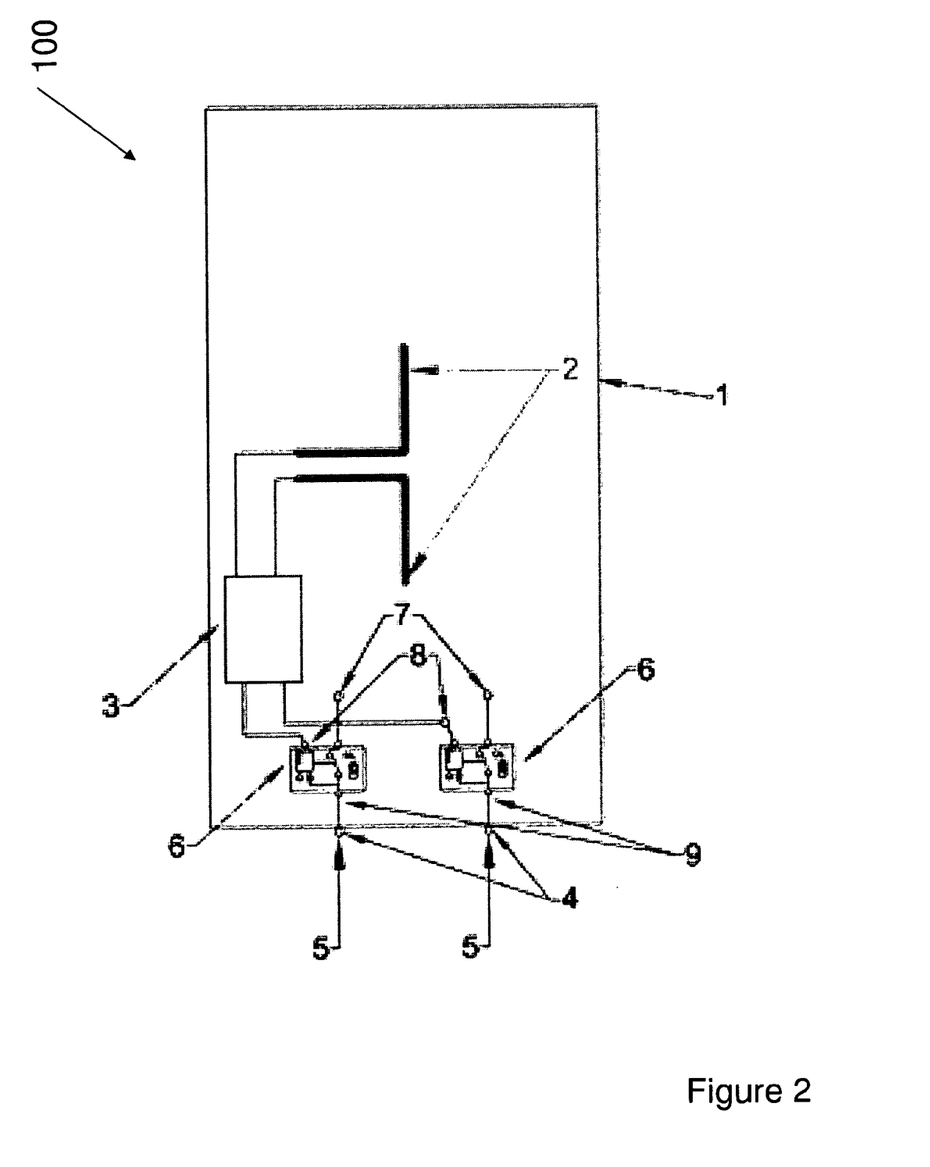
FIG. 2 is a schematic diagram of a smart antenna system according to an embodiment.

FIG. 2 shows a schematic diagram of apparatus 100 which is part of the smart antenna system 10 according to an embodiment of the invention. There is shown an antenna enclosure 1 (which is a radome); dipole probe 2; measurement circuitry 3; antenna connectors 4; antenna RF input 5 (from a base transceiver station); intelligent switches 6; antenna outputs 7; control circuitry 8; and control circuitry input connectors 9. The dipole probe 2 is an adhesive metal tape dipole, though other suitable dipoles may be used.

The radome 1 houses the antenna system, antenna radiating elements (not shown) and measurement and control mechanisms 3, 8 that will be described in detail below. The measurement dipole 2 is located on the front panel of the apparatus and measures the RF radiation emitted by the antenna radiating elements. The measurements are processed by the measurement circuitry 3 which filters out unwanted reception, translates the collected radiation and compensates for dipole probe inefficiencies (explained in detail below). The measurement circuitry 3 is connected to the control circuitry 8 and intelligent switches 6 in order to control the amount of power supplied from the antenna RF input 5 to the antenna via the antenna outputs 7. If the control circuitry 8 determines that the amount of RF radiation emitted, as determined by the measurement circuitry 3, exceeds a predetermined limit, the control circuitry 8 selectively blocks or disconnects the amount of power supplied to the antenna 7 from the antenna RF input 5.

By constantly measuring and calculating the emitted RF radiation (by the measurement circuitry 3 and using the calculated values in the control circuitry 8), the amount of power supplied to the antenna outputs 7 (and therefore RF radiation emitted by the antenna radiating elements) can be controlled. As the system is self-contained and feeds back, the control of the amount of RF radiation emitted can be performed in real-time.

Therefore the system actively controls the RF power supplied to the radiating elements of the antenna. This control causes the RF transmitted power, i.e. power radiated from the antenna in the form of RF radiation, to vary.

Such a system can be installed as a new installation, or retrofitted onto existing antennas. In particular, it may be installed on existing systems or radomes, or as part of a new radome on existing antennae.

Figure 3:
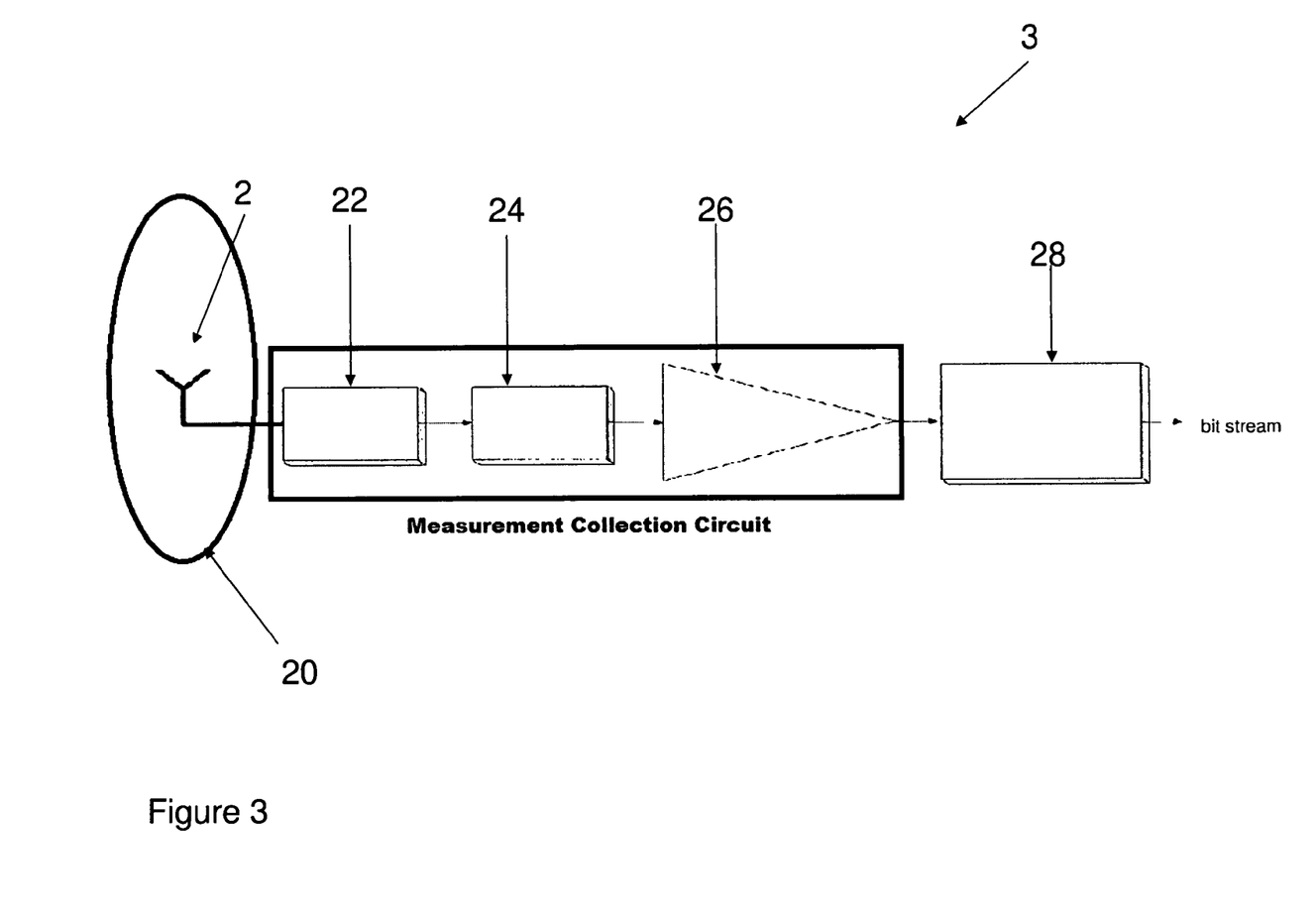
FIG. 3 is a schematic diagram of a dipole probe and measurement circuitry in accordance with an embodiment.

FIG. 3 shows a schematic diagram of the measurement circuitry 3. There is shown emitted radiation 20; dipole probe 2; bandpass filter 22; RF power detection unit 24; buffer amplifier 26; and converter 28.

In the measurement circuitry 3 the radiation 20 is measured by the dipole probe 2, and is transformed into DC voltage, the amplitude of which provides us with the radiation levels of the antenna. The measured level is filtered at the bandpass filter 22 to remove any extraneous signals, and RF power detector 24 detects a power level which may then be amplified (by buffer 26) and is then converted to a digital signal by converter 28.

Figure 4:
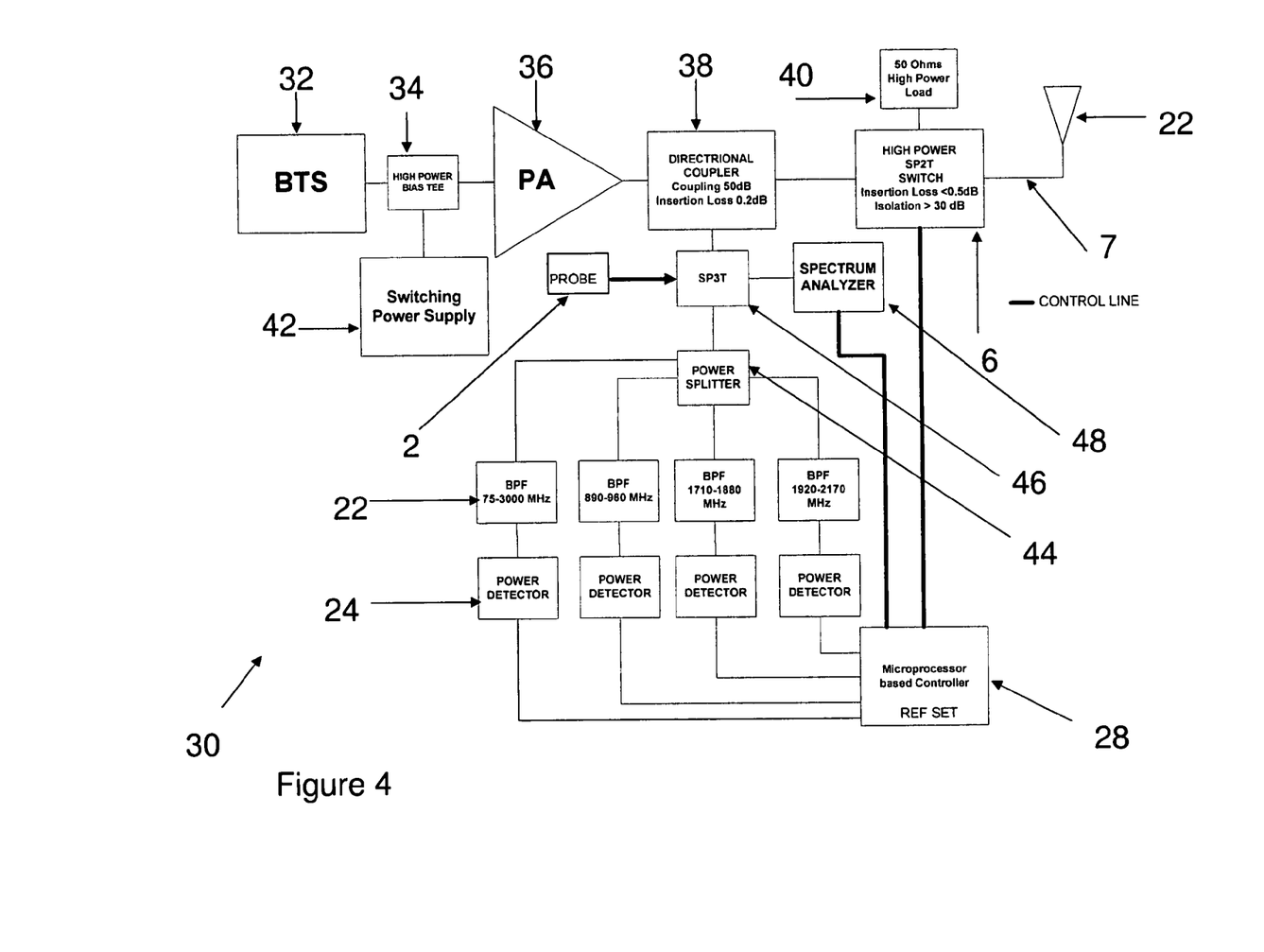
FIG. 4 is a diagram of a control circuit according to an embodiment.

FIG. 4 shows a more detailed diagram of some electronic components 30 of an embodiment of the invention. Like components shown in FIG. 3 are similarly labelled in FIG. 4. FIG. 4 shows base transceiver station (BTS) 32, switching power supply 42, high power bias tee 34, power amplifier 36, directional coupler 38, dipole probe 2, single pole triple throw switch (SP3T) 46, power splitter 44, bandpass filter 22, power detector 24, controller 28, spectrum analyser 48, high power switch 6, power load 40, antenna output feed 7 and antenna transmitter/receiver 22.

The following process outlines the supply of RF power directly to the antenna transmitter/receiver 22. Signals derived from the BTS 32 and power supply 42 are diplexed by the high power bias tee 34 and are then amplified by the power amplifier 36. This signal is then input to a high power switch 6 (which is also connected to controller 28), via a directional coupler 38. Measurement of the RF power can be performed by directional coupler 38, and the high power switch 6 is operated by the controller 28 accordingly. In this way, measurement of the RF power can be made directly at the source, thus improving the accuracy of the measured values. Such measurements may be used by the system in conjunction with, or independently of, measurements from the dipole probe 2. The directional coupler 38 comprises a coaxial cable.

Alternatively, parallel measurements from the dipole probe 2 and the input power from the base station 32 are used by the switch 6 (via controller 28) to disengage the RF input to the antenna 22. If the radiation exposure measured by either the dipole probe or the direct input RF power from the base station 32 exceeds a pre-defined threshold (described in more detail below) set in the controller 28, then the switch 6 is automatically set to disengage the input power to the antenna and to direct it to the dummy load 40. In this embodiment, the measured field strength and RF input power, as captured by the dipole probe 2 and the directional coupler 38, is input to a single pole multiple throw switch 46 in order to provide a parallel measurement at the switching intervals from 2 different routes to the controller 28 for evaluation. Measurement of the RF power by the directional coupler 38 (as well as input from probe 2) are in parallel evaluated for radiation emission exposure and input to the switch 6, which after comparing the measured value with pre-defined exposure limits set, operates switching of the signals to either a dummy power load 40 (if the measured value exceeds the pre-defined values set) or the antenna 22 (if the measured value is less than the predefined value). Switching of switch 46 is performed by the controller 28. The power splitter 44 may direct the signal through bandpass filters 22 (dependent on the frequency ranges of interest) and associated power detectors 24. The resultant determined power from both the dipole probe and directional coupler are fed into the controller 28 for evaluation. Operation of the high power switch 6 (disengage to dummy load or direct to antenna 22 if the exposure is within the pre-defined thresholds) is performed by controller 28 based on the evaluation.

Bandpass filters 22 filter discrete frequency bands of the signal from the directional coupler 38/dipole probe 2 which may correspond to frequencies used by different radio transmission technologies. Each power detector 24 within the discrete frequency bands. Spectrum analyzer 48 conducts an analysis of the entire frequency range of the signal received from the directional coupler 38/dipole probe 2 in order to allow the controller 28 to effectively 'cross check' the combined signal input from each of the power detectors 24 at least in respect to the probe.

The controller 28 has a memory (not shown) which stores threshold values indicative of permissible power values, as will be described in further detail below. If the controller 28 determines that the RF power measured (by the probe 2) exceeds the stored threshold value, the controller 28 operates the high power switch 6 accordingly.

Figure 5:
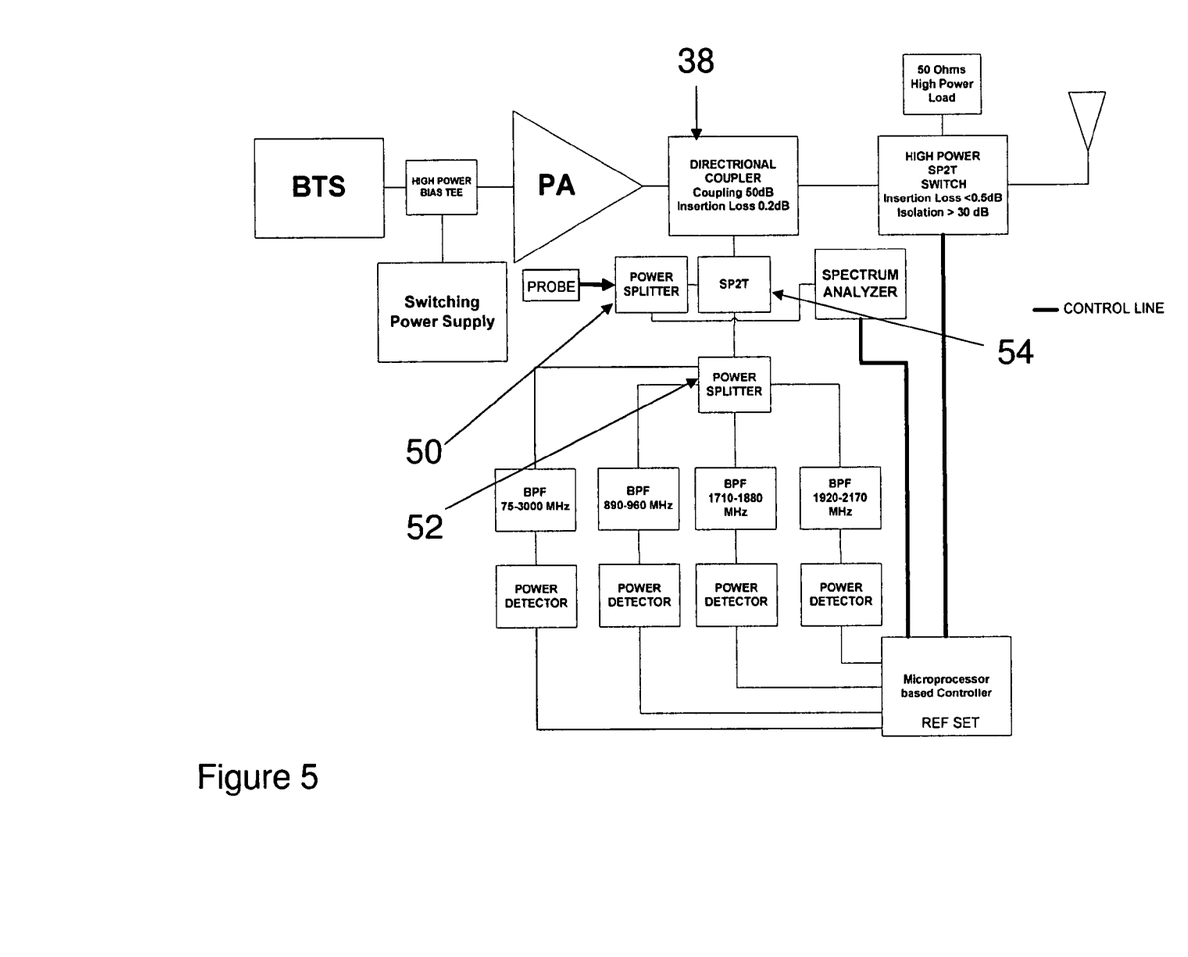
FIG. 5 is a diagram of a control circuit according to an embodiment.

FIG. 5 shows a similar diagram as shown in FIG. 4 but has an additional power splitter 50 at the dipole probe 2 input. The signal from the probe 2 is split by power splitter 50 such that it is directed to a single pole double switch 54 and spectrum analyser 48 for independent measurement that will be reported to the controller 28 for further processing. Switch 54 operates switching between power splitter 52 and directional coupler 38.

Figure 6:
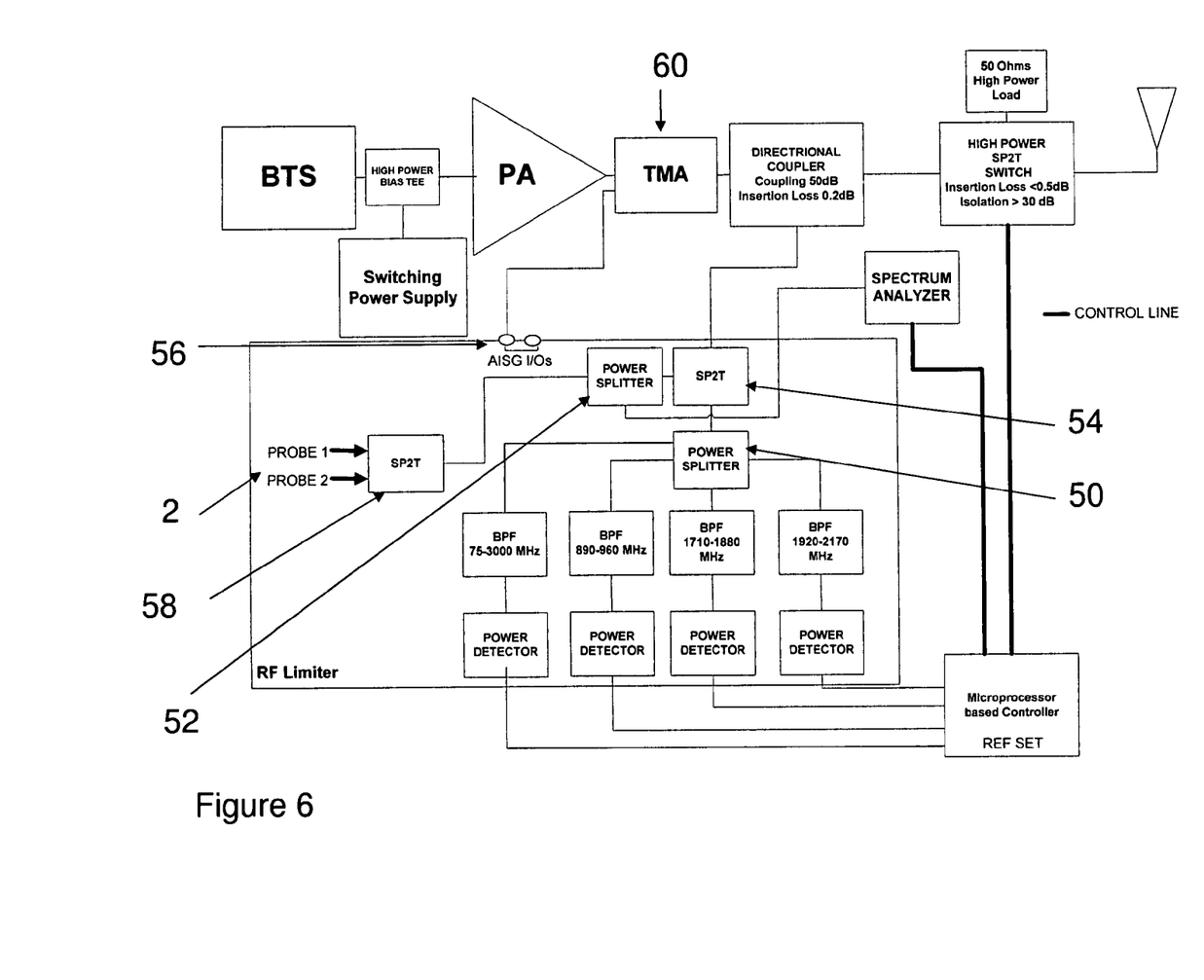
FIG. 6 is a diagram of a control circuit (also showing an interface) according to an embodiment.
Figure 7:
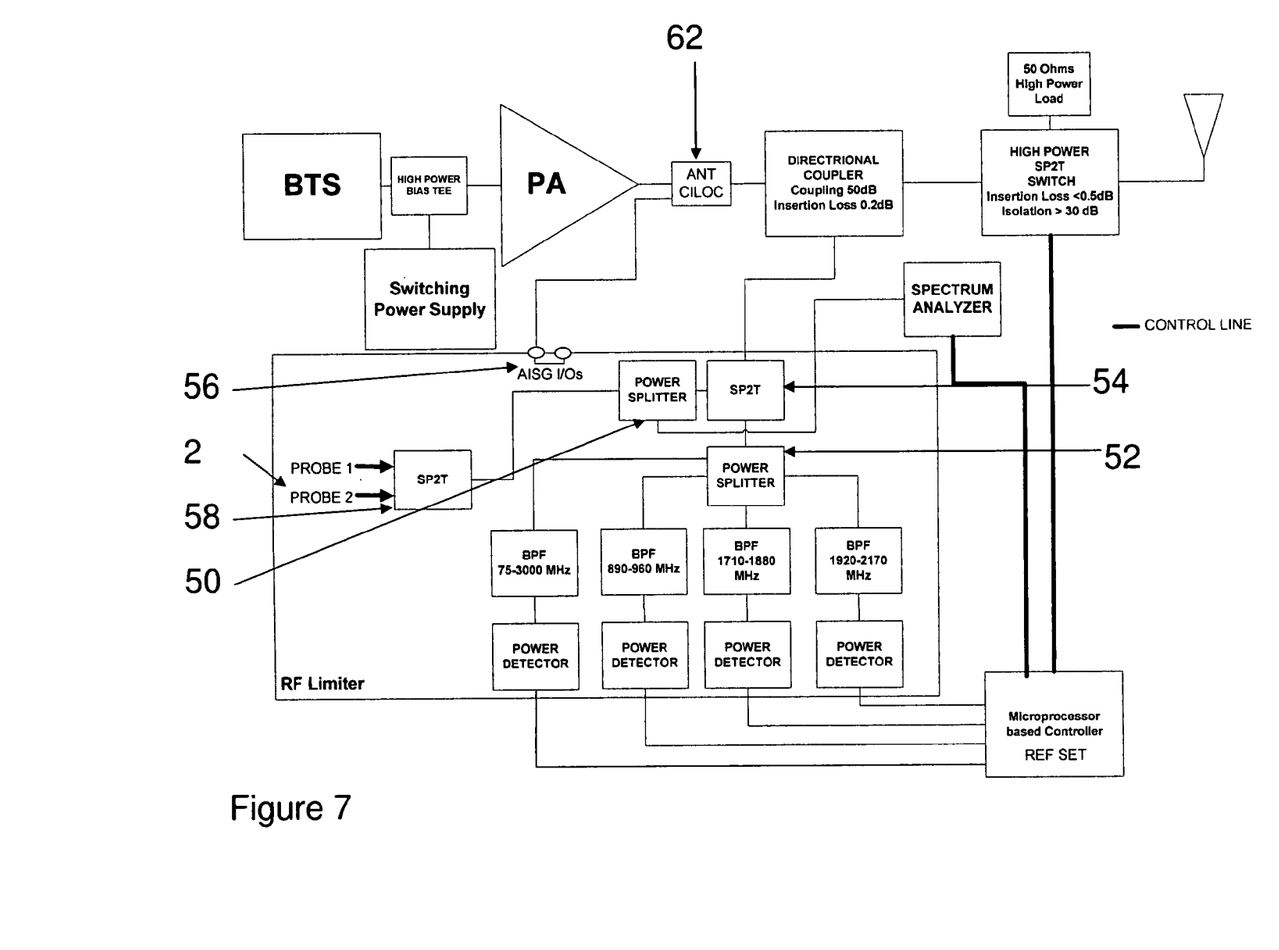
FIG. 7 is a diagram of a control circuit (also showing an interface) according to an embodiment.

FIG. 6 shows a further variation of the circuit of FIG. 4. Here, two probes 2 are used, one of which may perform near field measurements and one of which may perform far field measurements. The far field probe measures ambient radiation levels which are used during calibration. Signals from both are input to a single pole double throw switch 58 which operates a changeover between the two and directs the signal to power splitter 52. In this variation, the circuit includes interface 56 which utilizes the well established communication protocol (AISG) for control of antenna and antenna near devices such as a TMA (tower mounted amplifier) 60 for real time accessible monitoring of the controller 28.

Where the base station configuration requires DC power to be directed at the antennas through the coaxial cable, an ANT CILOC 62, as shown in FIG. 7, may be used. The AISG interface may be provided by the ANT CILOC 62 to control the circuitry and controller 28.

Figure 8:
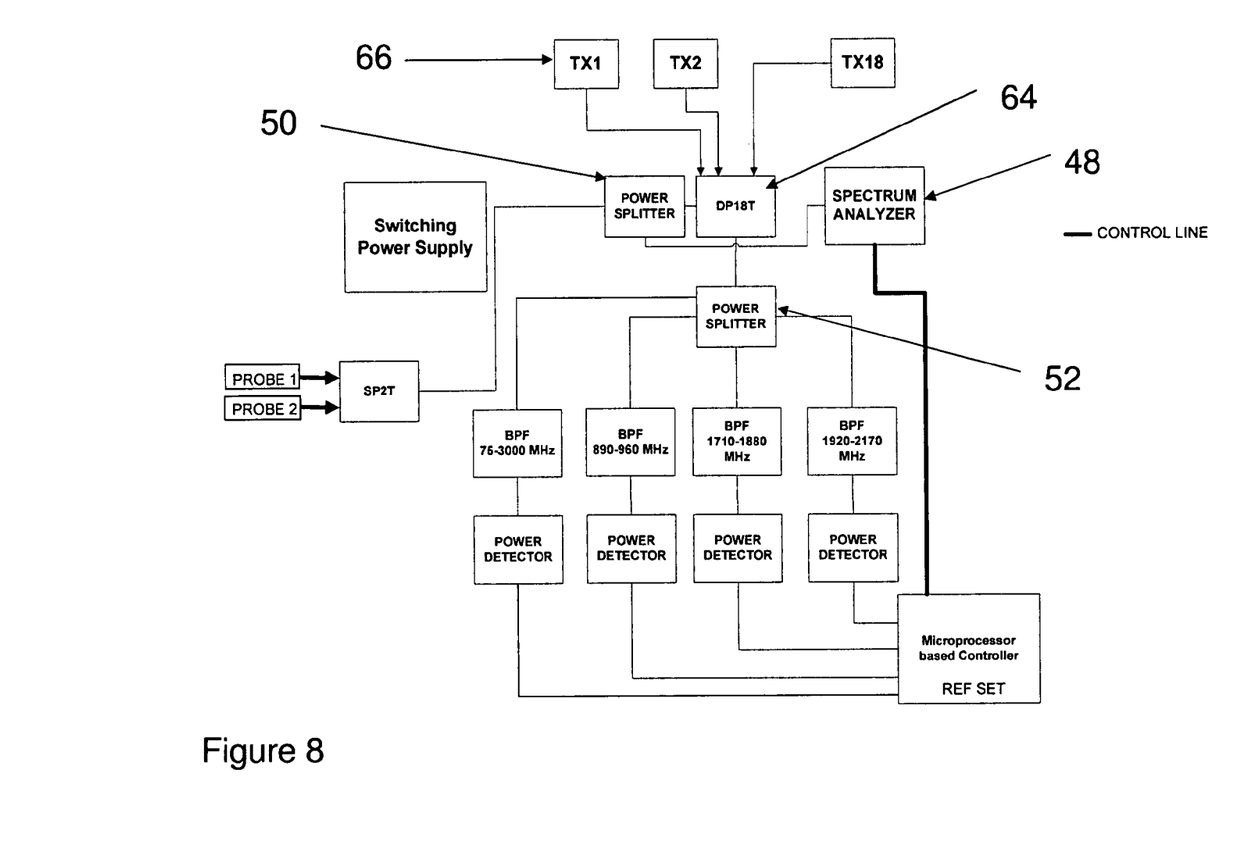
FIG. 8 is a diagram of elements of a control circuit according to an embodiment.
Figure 9:
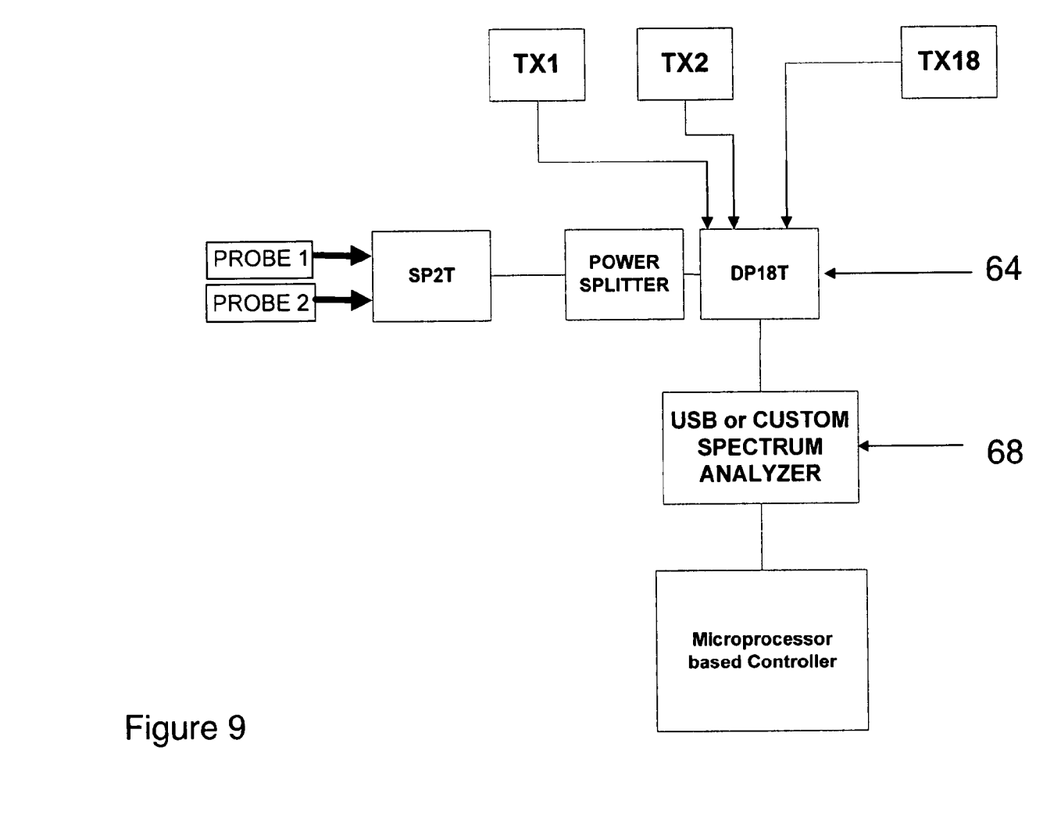
FIG. 9 is a diagram of elements of a control circuit according to an embodiment.

FIGS. 8 and 9 show variations of part of the circuitry shown in FIGS. 4 to 7. FIG. 8 shows a double dipole probe 2 input and a double pole multiple throw switch 64, suitable for the number of transmitter 60 inputs in the antenna system. In this embodiment, measurements from the probes 1 and 2 are analysed by spectrum analyzer 48 via power splitter 64. Inputs 1 to 18 correspond to direct measurement inputs from each of the transmitters, in the case where each transmitter has a separate feed line (case of more than one sector on a base station site). Switch 46 operates switching of the transmitter inputs to either power splitter 50 or power splitter 52. Power splitter 50 combines the inputs from the probes and the input from the switch 64 and directs it to the spectrum analyzer 48.

FIG. 9 shows an alternative version of the system shown in FIG. 8 in which the double pole multiple throw switch conducts a changeover of the signals from each of the transmitters to a USB or custom spectrum analyzer 68.

In order to achieve maximum efficiency in the antenna system 10, a number of issues need to be taken into account:

Firstly, the antenna performance should not deteriorate in order to perform measurement & control of radiation; characteristics such as azimuth and vertical −3 dB angles and gain may be affected by the installation of a measurement system in the antenna's main beam.

Obstacles (such as a probe) placed in the path of the antenna may affect the antenna performance. However, antenna theory suggests that electrically 'small' obstacles, in general, do not impact (or have minor impact) on antenna performance. However, this requirement (for negligible impact) needs to be balanced with the requirement that the near-field measured values are credible.

Figure 10:
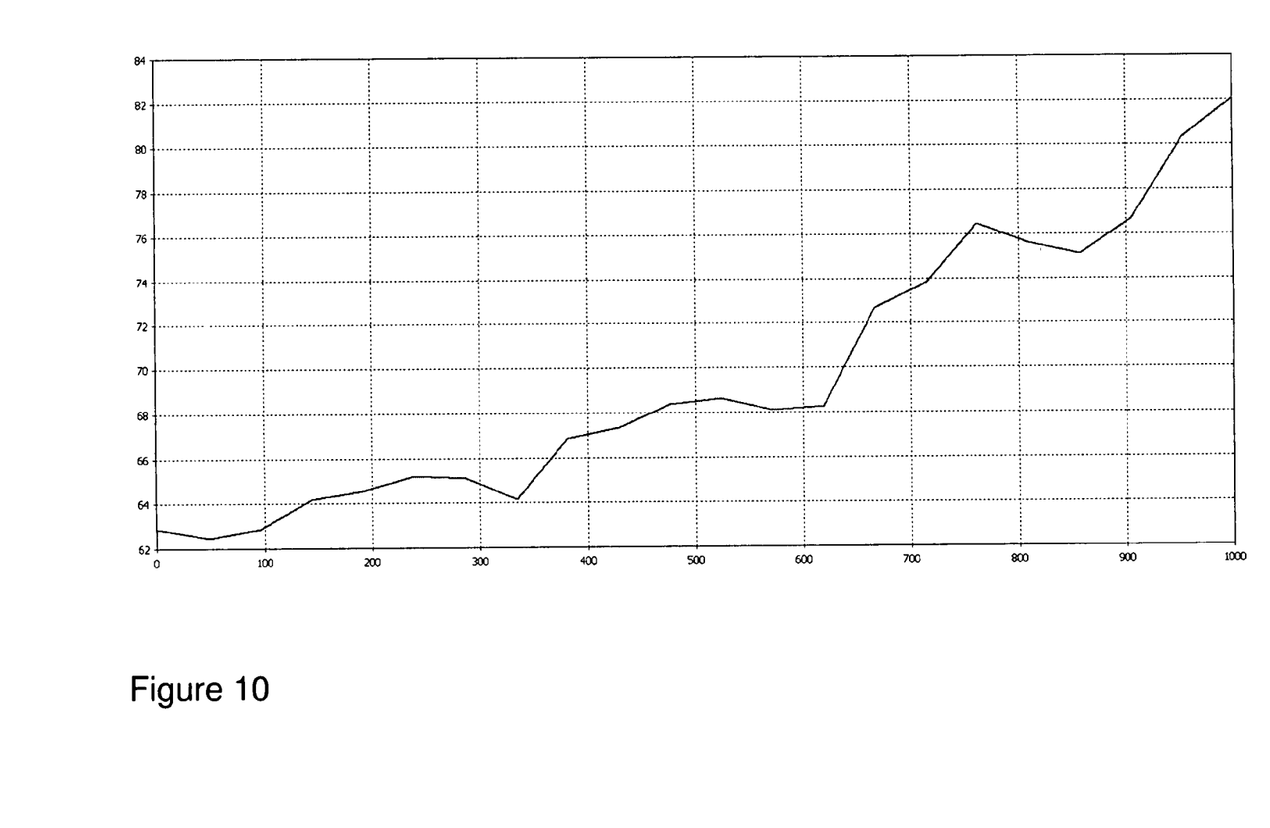
FIG. 10 is a plot of antenna azimuth angle variation vs. probing system dipole length.

FIG. 10 is a plot showing the effect of the length of measurement dipole 2 against the antenna azimuth angle. The simulation used a 2×16 dipole UMTS (universal mobile telecommunications systems) antenna having an active length of around 1 meter to verify that electrically small objects do not impact the antenna performance. The dipole probe 2 has a conductor of diameter 10 mm, length of 0-1000 mm and was placed at distance of 30 mm from the antenna radiating elements.

As can be seen from the plot, the shorter the dipole, the smaller the antenna azimuth angle variation.

The dipole probe 2 causes a variation on azimuth angle in the range of ~2° for a dipole probe length of approximately 300 mm (30% of antenna active length) and 20° for a length of approximately 1000 mm (100% of antenna active length). Thus, dipole probes of a length less than or equal to 10% of the active antenna length will have minor impact on antenna azimuth angle (less than 1°), and accordingly do not significantly deteriorate the antenna performance.

Figure 11:
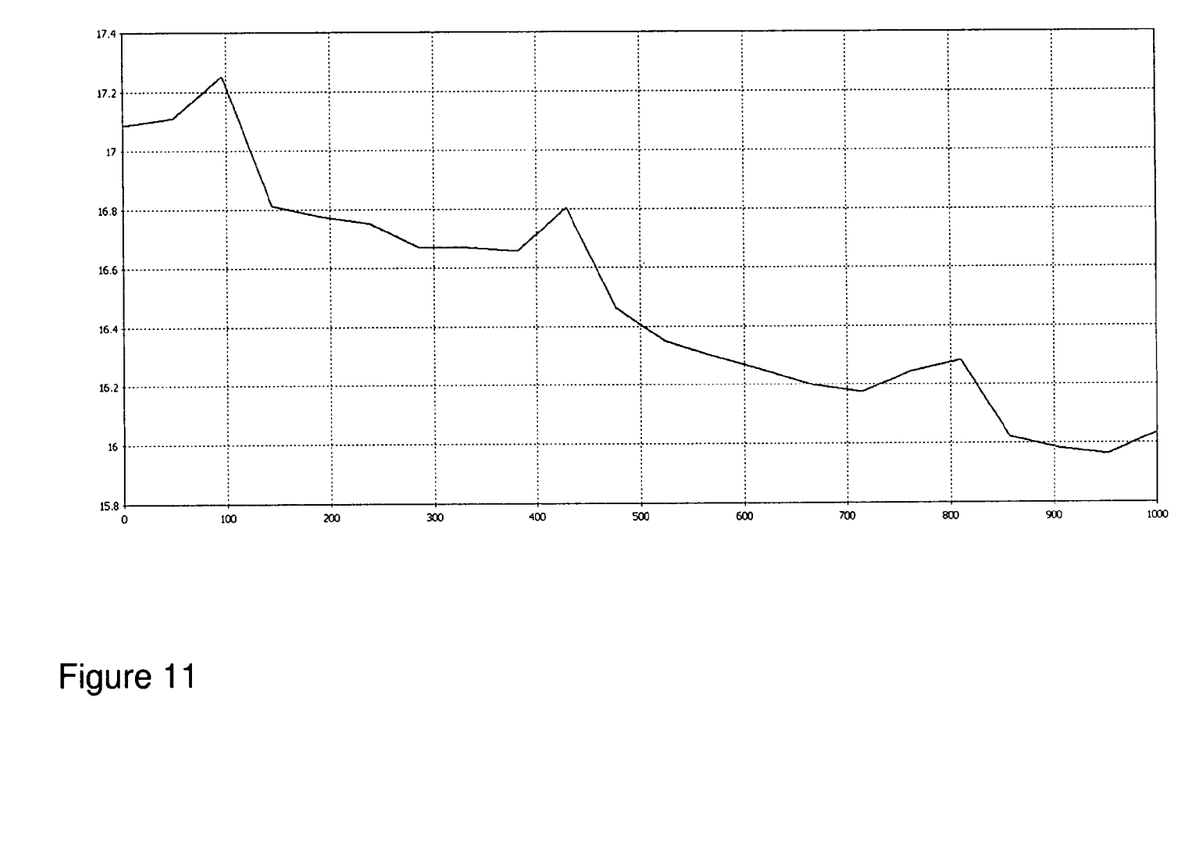
FIG. 11 is a plot of maximum gain variation vs. probing system dipole length.

As the azimuth angle increases with the presence of the dipole probe 2, a corresponding drop in gain is also expected. FIG. 11 shows a plot of gain variation against dipole probe length. As is clear from FIG. 11, a dipole probe 2 having a length less than 10% has a negligible effect on antenna gain (less than 0.5 dB).

For the 2×16 dipole UMTS antenna of active length of app 1000 mm the dipole probe 2 has a diameter of 10 mm, a length less than 10% (i.e. less than 100 mm) of the active antenna length and is placed more than 30 mm away from the antenna radiating elements.

Secondly, the measurement should be credible and representative for 'the worst case scenario' around the safety sphere 12 of the antenna (i.e. 360° at vertical plane and 360° at horizontal plane).

The worst case scenario can be determined by knowledge of the antenna radiation pattern.

Figure 12:
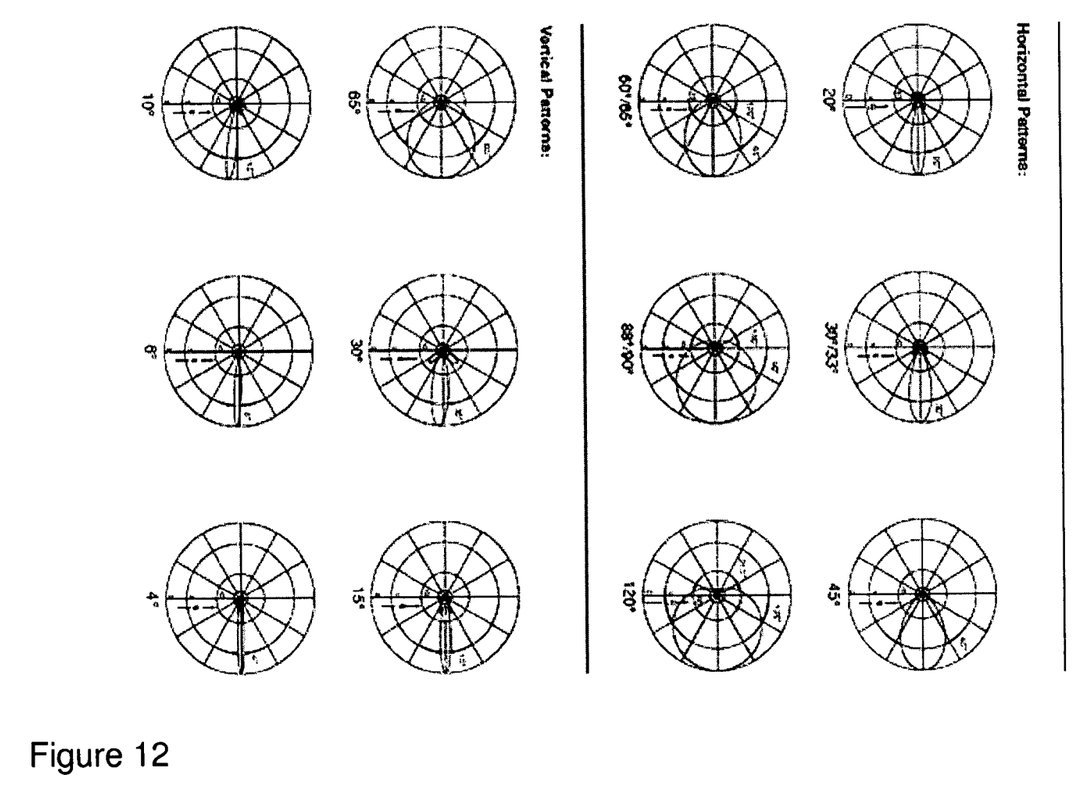
FIG. 12 is a series of diagrams showing exemplary antenna radiation patterns.

Modern communication antennas employ directive antennas that focus radiation at a specific azimuth and vertical angle. FIG. 12 shows a series of typical directional antenna radiation patterns for commercially available Kathrein antennas in the horizontal and vertical plane. By placing the dipole 2 at the centre of −3 dB radiation, the "worst case" measurement can be made—i.e. the location of the probe is where the radiation is the strongest. It is noted that within a determined distance of the probe dipole 2 from the antenna radiation elements (i.e. in our example placed at 30 mm), the measurement will be advantageously always independent of the antenna's electrical or mechanical tilt angles applied in the field.

It is important to achieve measurements of the transmitted radiation which are both representative and credible/accurate. As discussed above, the efficiency of the measurement performance of the dipole probe 2 is effected by the length of the dipole. For maximum efficiency, an effective length of the dipole probe 2 of at least ¼ of the wavelength of the frequency of the antenna operation is desirable. However, representative measurement is, in general, more importance than achieving maximum measurement efficiency. In order to tolerate degraded efficiency, the probe 2 is calibrated for use with a specific antenna.

Preferably, calibration occurs when the antenna and probe systems are integrated (whether for a new installation or a retrofitting of a probe system to an existing installation), which comprises fine tuning the measurement collection circuit 3 based on measurements derived in a controlled environment (such as an anechoic chamber) so as to allow for compensation due to ambient levels of radiation and employing known radiation characteristics of both receiver and transmitter parts. When a 2×16 dipole UMTS antenna and a probe having a length less than 10% of the antenna length is used at a 2 GHz UMTS operational frequency, a portion of the radiation emitted is input to the measurement circuitry 3 due to the use of an electrically small dipole probe. In order to compensate for radiation loss due to the dipole probe 2, measurements in a controlled environment, as well as theoretical calculations surrounding configuration efficiency, are conducted during the calibration procedure.

A correction factor, as calculated during the calibration process, is applied to the variable gain amplifier 26 in order to compensate for the fact that only a portion of the radiation is received by the probe 2 due to its length. Correction in the amplification of gain therefore compensates for measurement inefficiencies performed in the near-field.

Thirdly, varying the RF power transmitted should have negligible impact on the transmission of RF power to the antenna.

The effective isotropic radiated power (EIRP) is the amount of power that a theoretical isotropic antenna (which evenly distributes power in all directions) would emit to produce the peak power density observed in the direction of maximum antenna gain. EIRP can take into account the losses in transmission line and connectors and includes the gain of the antenna. The EIRP is an important criterion that determines radio coverage capabilities of the mobile communication network antenna installed. The EIRP is determined in part from the antenna gain and also from the transmitter RF input power 5 feed to the antenna system.

The present system addresses the need to manage the RF input 5 power due to the fact that RF radiation is not fixed on a multichannel mobile communication network.

Thus, in order to maintain a radiation safety distance from the source of radiation, the control mechanism must also therefore control the EIRP. The EIRP value is not fixed, and therefore control circuitry 8 on the antenna feed to monitor, block or regulate in real time the RF input power to the antenna feed is used, since variation in RF input power affects the EIRP value.

Specific predefined threshold values to regulate or block RF power are used, by the control circuitry 8, to allow for comparisons to be made between the measured and predefined values. The threshold values are stored in a memory (not shown) of the control circuitry.

If the control circuitry determines that the measured value exceeds the threshold value, the control circuitry 8 controls the emission of radiation from the antenna radiating elements using RF switch 6 as shown in FIGS. 4 to 7. Thus, real time measurements of the RF power from the dipole probe 2 and/or the directional coupler 38 indicate the strength of the emitted radiation. A value indicative of the maximum permissible radiation level at a specific distance (i.e. safety distance) are used by the control circuitry 8 to operate the switches so as to block or regulate the RF power emitted by the antenna.

High power RF switches 6 are known in the art and those based on semiconductor technology, such as single pole single throw (SPST) switches or varactor diodes, have been used to reconfigure polarization and radiation pattern on smart antenna technologies, radar technologies and other RF design applications.

High power RF switching for regulation/blocking of RF input power on mobile communication antennas can be deployed with single pole double throw (SPDT) switches (for blocking) that may direct RF power on dummy loads (shown as a SP2T on FIG. 4) or single pole multiple throw (SPMT) switches (for regulation) that can direct RF power to multiple attenuators.

The control circuitry 8 controls operation of the high power RF switch 6 continuously and in real time. Operation of the switches are based on the measured RF power, which is converted from V/m to V through the RF power detector 24, such that the input to the switch 6 is in a form recognizable by the switch 6. As shown in FIG. 4, the RF power switch 6 allows RF input at the antenna feed 7 (switch closed) or regulates or stops the RF input at the antenna feed 7 (switch open). This can be achieved by storing a fixed reference/threshold voltage to allow comparison, at the controller 28, between the measured power and the reference/threshold value. The fixed reference voltage allows the monitoring of a specific safety values of emitted radiation (i.e. the monitoring of a pre-determined safety distance).

In alternative embodiments, a variable reference voltage may be used by the controller 28 to operate the RF power switch 6.

The use of a variable reference voltage with a decision circuit can account for environmental factors and parameters which may affect the RF radiation, such as temperature, the neighbouring radiation emissions, etc.

Therefore, the system can monitor and regulate the RF input power to ensure that emitted radiation never exceeds a predefined value, or, by taking into account the distance relationship discussed above, that the safety distance does not vary.

In order to minimise any effect on the RF input path to the antenna when the switch is operated, the switch 6 should satisfy the following specification:

| Spec | Value | Unit |
|---|---|---|
| Operational Bandwidth | 800-2200 | MHz |
| Max input Power at Input 1 dB | 200 | Watts |
| Return loss In/Out | <15 | dB |
| Switch ON/OFF speed | <10 | μsec |
| Insertion Loss | <1 | dB |
| Isolation | >40 | dB |
| Power | +55 Volts/300 mA | — |
| Volatge Switch Control | 0/+5 | Volts (TTL levels) |

A Pin diode Switch from Aeroflex is an example of a switch which satisfies the above specifications. A key requirement in the control circuitry 8 is to have a value of the maximum input power that can satisfy high power applications, while also ensuring that the voltage standing wave ratio (VSWR) values for both transmitter (TX) and receiver (RX) paths is below 1.5, that the isolation value between ports TX & RX is greater than 40 dB and that the insertion system loss value is less that 1 dB, so as not to affect the EIRP value. Such requirements ensure that the switch has only a negligible impact on RF transmission performance.

The present invention therefore provides a smart antenna which allows for the real time monitoring of RF radiation, and the real time control of the antenna and regulation of the RF radiation emitted to ensure that the antenna does not emit radiation having a strength above a predetermined level. Whilst the present invention has been discussed with reference to maintaining the RF radiation below a certain value, the same principles may be applied to keep the emitted radiation levels above a value or within a set range.

The system described has a number of advantages such as: enabling determination of the electromagnetic environment in real time directly at the source of radiation; monitoring the RF input power at the antenna feed, thus making possible to stop or regulate the emission of RF radiation according to regulations; removing or reducing the need for electromagnetic compliance studies and measurements at the antenna surrounding environment; and providing mobile radio sites which are fully compliant with RF radiation regulations, regardless of the system parameters deployed (e.g. RF power, antenna gain, etc).

Such a system can be manufactured integrally with an antenna system such that it forms part of a new antenna system assembly. Alternatively, a device comprising the probe 2 and/or directional coupler 38, measuring circuitry 3, regulating circuitry 8 etc., can be retrofitted onto existing antenna installations (i.e. including those already installed in the field) to facilitate measurement and regulation of RF radiation emitted from existing antennas. Such a retrofitted system may be supplied as a collection of components (e.g. comprised in a device) to be installed at existing antenna locations or as part of radome 1 with one or more of the components integrated into the radome.

The invention claimed is:
1. An antenna measurement and control system for use with a transmitting antenna, the system comprising:
a sensor configured to determine an indication of the amount of power radiated by the antenna;
control circuitry connectable to the antenna and configured to selectively vary, or disengage, the power supplied to the antenna; and
a processor connectable to the sensor and control circuitry, wherein the processor is configured to control the control circuitry to decrease or disengage the power sup- plied to the antenna when the determined indication of the amount of power radiated exceeds a predetermined limit;

wherein the predetermined limit corresponds to a maximum radiated power at a set distance from the antenna.

2. The antenna system of claim 1, wherein the sensor is positioned at a predetermined location that is a distance from the antenna and is configured to measure radiation received from the antenna at the predetermined location.

3. The antenna system of claim 2, wherein the sensor comprises a probe.

4. The antenna system of claim 3, comprising a further sensor configured to measure power fed to the antenna.

5. The antenna system of claim 3 wherein the dipole probe length is such that presence of the probe causes the −3 dB antenna azimuth and vertical angle to vary by less than 1 degree, and wherein the probe is operably placed at a distance of 30 mm or greater away from the radiating elements of the antenna.

6. The antenna system of claim 1, wherein the sensor is configured to measure power fed to the antenna.

7. The antenna system of claim 6, wherein the sensor comprises a directional coupler.

8. The antenna system of claim 7, comprising a further sensor positioned at a predetermined location that is a distance from the antenna and is configured to measure radiation received from the antenna at the predetermined location.

9. The antenna system of claim 1 wherein the processor is configured to control the control circuitry to decrease the power supplied until such time that the determined indication of the amount of power falls below the predetermined limit.

10. The antenna system of claim 1 wherein the processor is configured to control the control circuitry to vary or disengage the RF power supplied in a substantially real time manner.

11. The antenna system of claim 1, wherein the processor is operably placed outside the main radiation beam of the antenna.

12. The antenna system of claim 1, wherein the system comprises a radome for surrounding the antenna, the sensor being located on or in the material of the radome inside the −3 dB main radiation beam.

13. The antenna system of claim 1 wherein the control circuitry comprises one or more high power RF switches to vary, or disengage, the power supplied to the antenna.

14. The antenna system of claim 1, further comprising an AISG compliant interface,
wherein the interface is configured to output measurement results and
wherein the system is configured to output measurement results in real time.

15. An antenna measurement and control system for use with a transmitting antenna, the system comprising:
a sensor configured to determine an indication of the amount of power radiated by the antenna;
control circuitry connectable to the antenna and configured to selectively vary, or disengage, the power supplied to the antenna; and
a processor connectable to the sensor and control circuitry, wherein the processor is configured to control the control circuitry to decrease or disengage the power supplied to the antenna when the determined indication of the amount of power radiated exceeds a predetermined limit;
wherein the predetermined limit is variable in response to variation in environmental factors including temperature and neighbouring radiation emissions.

16. An antenna measurement and control system for use with a transmitting antenna, the system comprising:
a sensor configured to determine an indication of the radiation emitted by the antenna;
control circuitry connectable to the antenna and configured to selectively vary, or disengage, the power supplied to the antenna;
a processor connectable to the sensor and control circuitry, wherein the processor is configured to control the control circuitry in response to the determined indication of the emitted radiation;
wherein the sensor is positioned at a predetermined location that is a distance from the antenna and is configured to measure radiation received from the antenna at the predetermined location;
wherein there are two sensors, each sensor comprising a probe, wherein one probe is a near field probe and the other is a far field probe, and wherein the near field probe is positioned to measure radiation received from the antenna and the far field probe is positioned to measure radiation not emitted by the antenna, and further wherein measurements from the near field sensor and far field sensor are used to calculate radiation emitted by the antenna.

17. An antenna measurement and control system for use with a transmitting antenna, the system comprising:
a sensor configured to determine an indication of the radiation emitted by the antenna;
control circuitry connectable to the antenna and configured to selectively vary, or disengage, the power supplied to the antenna;
a processor connectable to the sensor and control circuitry, wherein the processor is configured to control the control circuitry in response to the determined indication of the emitted radiation;
wherein the value indicative of the power emitted by the antenna is calculated by scaling the radiation measured by the sensor by a predetermined calibration factor, representative of the total emitted radiation, wherein the calibration factor is at least based on the sensor efficiency and the physical characteristics of the antenna.

* * * * *